March 26, 1929.  E. OSSWALD  1,707,136
HOSE CLAMP
Filed Nov. 2, 1927
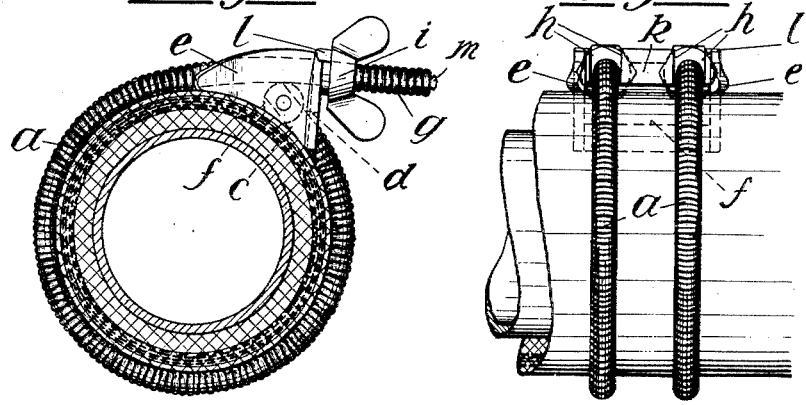
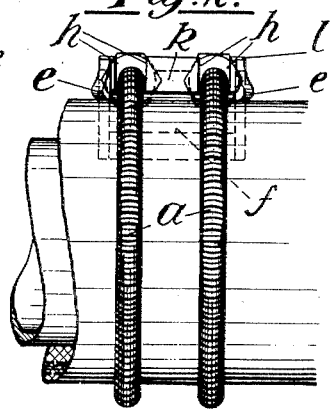
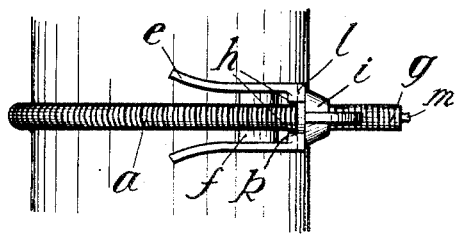
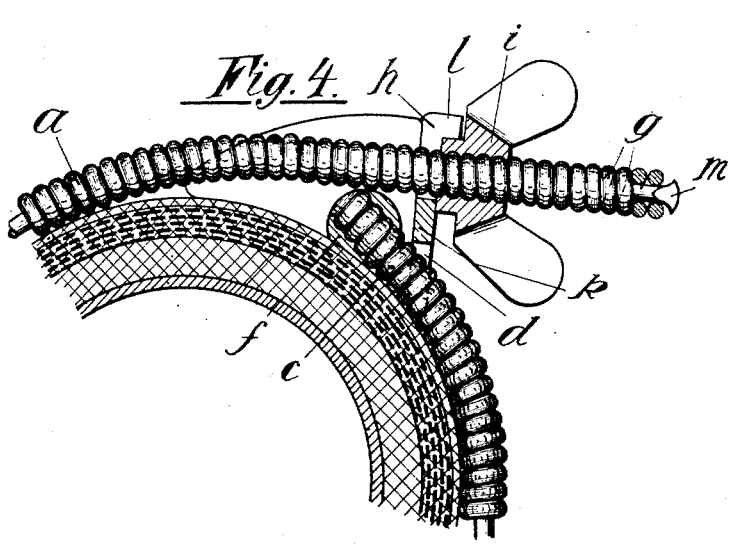

Patented Mar. 26, 1929.

1,707,136

UNITED STATES PATENT OFFICE.

EUGEN OSSWALD, OF STUTTGART, GERMANY, ASSIGNOR OF ONE-HALF TO EUGEN BOCKORNY, OF STUTTGART, GERMANY.

HOSE CLAMP.

Application filed November 2, 1927, Serial No. 230,650, and in Germany December 11, 1926.

This invention relates to a hose-clamp for various purposes, characterized in that the tying band consists of a wire spiral, in which a straight-wire may be inserted or not. The tying band is fixed at the one end in the clamp-casing and wound around the hose, whereupon the other end is hung into said casing. The wire-spiral serves at the same time as screw for a nut screwed onto the end of the wire-spiral and designed to tightly pull the tying band around the hose.

The improved hose-clamp is shown by way of example in the accompanying drawing, in which:

Fig. 1 is a front-elevation, the hose being shown in section.

Fig. 2 is a side elevation and

Fig. 3 a top-plan view.

Fig. 4 shows on larger scale a constructional detail.

The tying band consists of a wire spiral $a$ of steel or other hard material. In the wire-spiral $a$ a wire $m$ is located which serves as core. The windings of the wire-spiral serve at the same time as screw-threads. The one end $c$ of the wire-spiral $a$ is inserted through a slot $d$ of the clamp-casing and fixed on a bolt $f$. The other end $g$ of the wire-spiral $a$ is wound around the hose to be fixed and inserted through a slot $h$ of the clamp-casing, whereupon a nut $i$, screwed on to this end $g$ of the wire-spiral, is tightened. The nut $i$ may be a thumb-nut or a polygonal-nut.

The hose-clamp may comprise several wire-spirals arranged side by side, the casing $e$ being then of corresponding width and having a necessary number of slots $h$ and hose.

The casing $e$ is bow-shaped, the portion designed to bear onto the hose being curved in accordance with the curvature of the hose. The two arms of the bow are beveled. A clamp with one wire-spiral is sufficient for hoses of small diameter, while for hoses of greater diameter a clamp having several wire-spirals is preferably used.

The central-portion $k$ of the bow has at the top-edge a flange $l$, behind which engages the nut $i$ so that the wire-spiral $a$ is securely held in the slot $h$. The wire-spirals of steel-wire may be made also without wire-core.

I claim:

1. A hose clamp comprising a tying band consisting of a wire spiral, and a wire core in said wire spiral.

2. A hose clamp comprising a tying band consisting of a wire spiral said wire spiral serving at the same time as screw for a tensioning nut.

3. A hose clamp, comprising in combination a casing serving as stretching-shoe and having a hole and a slot, a bolt rotatably mounted in said hole of said casing, a tying band consisting of a wire spiral one end of said band being inserted into said hole of the casing and attached to said bolt the tying band being placed around the hose and the other end of said tying band being laid into said slot of said casing, and a nut screwed onto this end of said wire spiral to stretch said tying band accordingly.

EUGEN OSSWALD.